Sept. 18, 1956    H. G. FAY    2,763,032
METHOD OF INJECTION MOLDING AROUND A PLURALITY OF INSERTS
Filed June 14, 1949
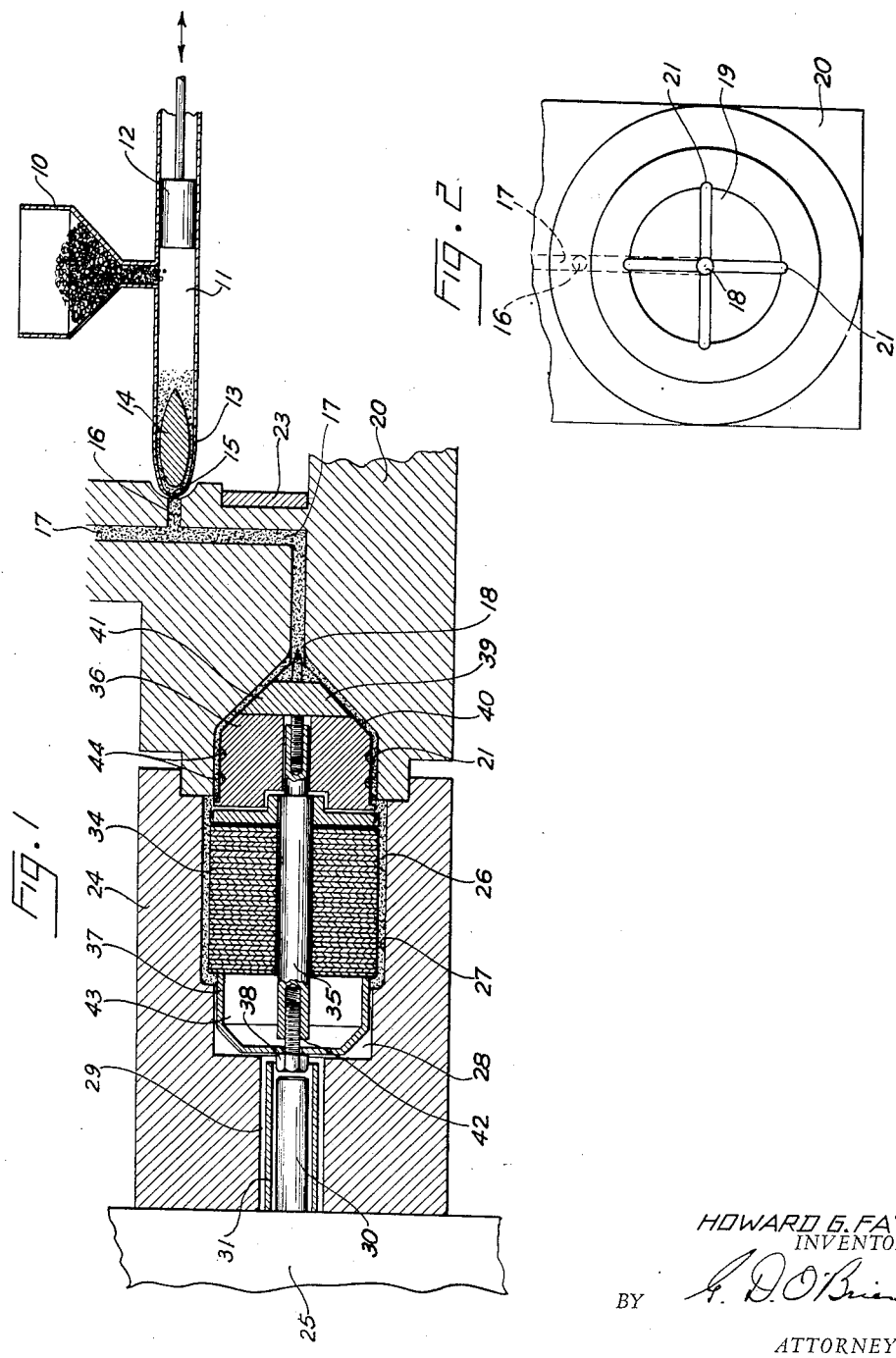
HOWARD G. FAY
INVENTOR
BY
ATTORNEYS

United States Patent Office 2,763,032
Patented Sept. 18, 1956

2,763,032

METHOD OF INJECTION MOLDING AROUND A PLURALITY OF INSERTS

Howard G. Fay, Rochester, N. Y., assignor, by mesne assignments, to the United States of America as represented by the Secretary of the Navy Application June 14, 1949, Serial No. 98,922

3 Claims. (Cl. 18—59)

This invention relates to improvements in injection molding. More particularly, the invention relates to improvements in the injection molding of a jacket of plastic material around a stack of apertured members assembled in aligned relation on a mandrel.

Injection molding essentially involves heating a molding material in a heating cylinder to a plastic state and then forcing it by means of an injection ram into cavities of a cold mold. Usually the amount of material delivered to the heating cylinder is exactly the amount required to completely fill the cavities. The injection ram forces this material into the heating cylinder and in so doing pushes a like amount of material in a plasic state out of the other end of the heating cylinder through the sprue and runners into the cavities. Ejection of the molded part is usually automatic.

Injection molding is by far the fastest type of molding. In compression molding the required amount of molding compound is placed into the lower part of the mold, the mold and its contents are heated to the required temperature, and the mold is closed by the application of pressure. Cold water is then used to cool the mold to the ejection temperature. Obviously, it is necessary to heat and cool the mold as well as the molding material. In injection molding it is not necessary to alternately heat and cool the mold. Consequently, the molding cycle in injection molding requires only a fraction of the time required for compression molding.

To obtain the advantages of injection molding it is necessary to force the molding material into the mold at such speed that the mold is completely filled before the thermoplastic starts to set through contact with the cooler mold. Partial chilling of the surface before the cavities are filled will cause flow marks and strains, which make the molded part more likely to warp under varied atmospheric conditions. Hydraulic pressures usually encountered in injection molding are measured in tons per square inch on the molding material. Because of the high pressures encountered in injection molding inserts are never used in the molded part if they can be avoided. Considerable stresses are set up in molded parts of irregular design such as parts with thin and thick sections, and especially parts with metal inserts. To relieve these stresses slow cooling of the part is usually provided. Often inserts are preheated prior to molding to improve the flow of the material and to eliminate the possibility of weld marks which often result in cracking of the part after cooling.

If the stresses developed during injection molding were caused by hydrostatic pressure only the pressure at all points in the mold would be uniform as to direction and magnitude, and all the forces acting on an insert would be balanced. Consequently no damage, distortion, or moving an insert out of position would occur. This is a theoretical condition which does not obtain in practice, and in production runs the number of rejects caused by distortion or displacement of the inserts is high.

This difficulty is aggravated further when a jacket of plastic material is molded around a stack of elements assembled in aligned relation on a mandrel or clamping member. It is desired, for example, to plastic jacket a battery unit made up of an aligned stack of alternate battery plates and insulators. Heretofore a split mold was utilized for this operation, and the plastic material was introduced from the gates of runners located along the parting line of the mold perpendicular to the axis of the battery. This is according to common practice. If multiple-cavity molds were used, full-round runners were provided, which have the least periphery for a given diameter, and hence the least chilling effect on the thermoplastic as it passes through the runners. One half of a runner, semi-circular in cross-section, was cut in half of the mold to register with a similar half of the runner cut in the opposite half of the mold. The gates of the runners were located on the heavy section of the article, normally along the parting line of the mold. Consequently high stresses were developed temporarily (i. e., while the plastic is flowing) perpendicular to the axis of the inserts with resulting distortion and displacement of the inserts. Often the paper-thin battery plates were of greater diameter than the insulators situated between them, and the temporary stresses caused by the flow of molding material were sufficient to bend the edge of a plate and thus cause an electric short between adjacent plates.

The primary object of the invention is to eliminate the effects of such temporary stresses, by introducing counteracting pressures.

Because of the large number of alternate plates and insulators included in a battery unit, wide variation in overall height of the stacks occurs because of necessary tolerances that must be permitted in the thickness of sheets from which the battery plates and insulators are blanked. If most of the plates or insulators in a stack are near either the maximum or minimum allowable thickness, the overall height of the stack can vary widely from the desired dimension. Consequently variations in clamping pressure maintained on the stack occur, and it is necessary to reject many molded batteries because of plastic being improperly forced between pieces. Even when torque wrenches are used in tightening the clamping members of a mandrel the molding stresses mentioned above are sufficiently great to force molding material between adjacent plates and insulators.

Heretofore molding apparatus was incapable of efficiently molding a jacket of plastic material around a stack of members assembled in aligned relation on a mandrel. The number of rejects caused by distortion of the stack and by air bubbles in the jacket of plastic material was so high that it was more economical to preheat the stack to approximately 300° F., to retighten the stack after preheating, and then to mold at approximately one tenth normal molding pressure. This was all very time consuming although preheating of the stack improved the flow of the molding material. The method of retightening the stack after preheating and molding at reduced pressures decreased the number of rejects caused by molding material between plates and insulators, by short circuits between adjacent plates, and by air bubbles in the jacket of plastic material. Although this method did reduce the high stresses on the inserts, the time of the injection molding cycle was approximately forty minutes. Consequently, all the advantages of injection molding over compression molding were lost because of the longer molding cycle required.

It is an object of this invention to provide apparatus capable of the plastic jacketing at normal molding pressure of an insert consisting of a stack of apertured members assembled in aligned relation on a mandrel without bending the apertured members or forcing material between adjacent members and without displacement or distortion of the stack.

According to the invention the stresses developed on an insert consisting of a stack of apertured members assembled in aligned relation on a mandrel during an injection molding operation are controlled so that the stresses caused by the initial flow of molding material are parallel to the axis of the mandrel and supplement the mechanical forces tending to keep the pieces in alignment, and subsequent stresses normal to the axis of the mandrel are balanced so that no damage, distortion or displacement of the insert results. The timing is the important factor in the application of the various stresses inherent in the actual flowing of the plastic, i. e. in the dynamic as compared to the static stresses.

A further object of the invention is to provide a superior method of injection molding of a jacket of plastic material around a stack of apertured pieces assembled in aligned relation on a mandrel whereby high injection molding pressures can be utilized without the necessity of preheating the stack and retightening the mandrel before the introduction of the molding material.

It is a further object of the invention to provide a method for substantially reducing the time required to injection mold a jacket of plastic material around a stack of apertured members assembled in aligned relation on a mandrel.

Briefly it may be pointed out that these and other objects may be accomplished by introducing the molding material through a single cavity nozzle whose axis is in alignment with the axis of the mandrel on which the members are assembled. Thus the initial flow of molding material will impinge axially on the mandrel and the stresses caused by the initial flow will be parallel to the axis of the mandrel and will supplement the mechanical forces holding the apertured members in alignment.

Other objects and advantages of the invention will be apparent from the following description taken in connection with the accompanying drawings which form a part hereof.

In the drawings:

Fig. 1 is a vertical sectional view of an insert positioned in a single cavity of a mold according to the invention.

Fig. 2 is a left end view of the stationary half of the mold.

Many of the parts needed for complete automatic operation of an injection molding machine may be performed by operating units well known to those skilled in the art and are here omitted or shown conventionally, since any detailed description thereof would serve only to lengthen the specification without aiding the understanding of the invention.

An injection molding machine is conventionally shown in Fig. 1 including a gravity feed hopper 10 which accurately proportions the amount of granules of thermoplastic into the feed chamber 11. A reciprocating injection ram 12 then compresses the thermoplastic and forces it through a heating cylinder 13 where it is spread out thinly by a torpedo 14 set in the course of the material. The torpedo 14 assures uniform heating of the thermoplastic.

In forcing the thermoplastic into the heating cylinder 13 the injection ram 12 pushes a like amount of material in thoroughly softened form out of the heating cylinder nozzle 15 which abuts against a sprue 16 leading into the mold cavity. Leading off from the sprue 16 are the runners 17 which carry the soft plastic into the cavities that are to be filled.

Only a single cavity of a multiple cavity mold is illustrated in Fig. 1. The single cavity is made up basically of a pair of cooperating relatively movable stationary and movable mold sections or dies for shaping the mold product. A cavity nozzle 18 leads from a runner 17 into the cylindrical cavity 19 formed in the stationary mold section 20. Four runners 21 are provided at equal intervals around the circumference of the cavity 19 as shown in the left end view Fig. 2 of the stationary mold section 20. A heater 23 is provided in the stationary mold section 20 to assure thorough heating of the thermoplastic.

The movable mold section includes a cavity frame 24 retained on a movable platen 25. The cavity 26 in the cavity frame 24 consists of a cylindrical jacket-shaping matrix 27 along the lower end thereof and a cylindrical compartment 28 along its upper end. A cylindrical aperture 29 is provided in the cavity frame 24 at the upper end of the cavity 26, and a stop pin 30 mounted on the movable platen 25 extends into the aperture 29. An ejector sleeve 31 mounted on a movable knockout plate (not shown) envelops the stop pin 30 within the aperture 29. In proper sequence in the injection molding cycle the moving platen 25 causes the movable mold section to close firmly against the stationary mold section 20.

The insert in the cavity 26 consists of a stack of apertured members 34 assembled in aligned relation with the core 35 of a mandrel extending through the apertures in the members 34. The stack is clamped between a cylindrical (plastic spreading) head 36 and a cap 37 as described in my co-filed application Serial Number 98,921. Reference is also made to a co-filed application of David L. Babcock, Serial Number 98,923. The insert is adapted to fit lengthwise in the cavity 26 with the cap screw 38 extending into the aperture 29. Close fits are provided between the cap 37 and the compartment 28 and between the spreading head 36 and the cavity 19 in the stationary mold section 20 to retain the insert in a central position in the mold cavity. The spreading head 36 and the spreading head screw 39 are formed with surfaces 40 and 41, respectively, inclined at an angle to the axis of the cavity nozzle 18 which cooperate with the cavity 19 to distribute the molding material radially through the runners 21 to the outside of the cavity.

In an injection molding cycle the insert is first positioned in the material receiving cavity 26 in the movable mold section. The movable mold section is then actuated by the movable platen 25 to close against the stationary mold section 20. The nozzle 15 of the heating cylinder 13 then comes against the sprue 16 and the injection ram 12 forces molding compound into the heating cylinder 13 and in so doing pushes a like amount of material in a plastic state through the sprue 16, the runners 17, the cavity nozzle 18, and the runners 21 into the jacket-shaping matrix 27 at such speed that the mold is completely filled before the plastic starts to set through contact with the cooler mold.

If the properties of the molding material were such that the forces in a mold were purely hydrostatic, the pressure at all points in the mold would be equal in magnitude and direction. Such a theoretical condition does not result instantaneously in an injection molding operation and high dynamic stresses caused by the initial flow of the molding material are developed temporarily on the inserts. In molds heretofore used, these high stresses on the inserts were not controlled and resulted in breaking or damaging of the inserts or moving them out of position. In the present invention the initial high stresses developed on the inserts have been controlled so the forces due to the initial flow of molding material are exerted axially of the insert and supplement the clamping pressure exerted between the cap 37 and the spreading head 36 tending to keep the apertured members 34 in alignment. Thus the mold has been designed so that none of the high stresses due to the initial flow of molding material have any unbalanced component perpendicular to the axis of the insert. These stresses thus have no tendency to distort or damage the insert or to move it out of position.

The molding material flowing from the cavity nozzle 18 initially impinges axially against the spreading head screw 39. The surfaces 40 and 41 cooperate with the cavity 19 to distribute the molding material radially through the runners 21 to the cavity 26. The plastic is distributed uniformly around the insert, and subsequent forces perpendicular to the axis of the insert caused by the flow of molding material are balanced by equal and opposite force acting diametrically opposite on the insert. Thus is the present invention the dynamic forces due to the flow of molding material have been controlled so that no bending of the apertured members 34, forcing of molded material between members 34, or distortion or displacement of the stack results. With the present invention a jacket of plastic material can be molded around a stack of apertured members 34 at normal molding pressures without the necessity of preheating and retightening the insert before molding as was heretofore required. With the present invention the molding operation can be completely automatic and the time of the invention molding cycle is greatly reduced beyond the time heretofore required or the time required for compression molding.

As described in the above mentioned co-filed application clearance is provided between the end 42 of the core 35 and the compartment 43 formed in the cap 35. The initial flow of molding material pushes the cap 37 firmly against the end of the compartment 28 of the cavity 26. The stresses due to the flow of molding material are transmitted through the spreading head 36 to compress the stack against the cap 37. The amount of pressure exerted on the stack can be regulated as desired by providing a stop pin 30 against which the cap screw 38 abuts after a predetermined travel of the core 35. The stop pin 30 limits the movement of the core 35 toward the upper end of the cavity 26 and thus prevents shearing of the members 34.

The injection ram 12 maintains pressure on the molding material as it cools in the mold. After a desired interval the injection ram 12 returns to its neutral position and the moving platen 25 is actuated to open the mold. The molded stack adheres to the movable section of the mold as the die opens, and grooves 44 cut around the periphery of the spreading head 36 act as a sprue puller to clear the cavity nozzle 18 for the next shot. At the end of the mold opening stroke, the ejector sleeve 31 is actuated to push the molded insert out of the cavity 26. After the molded article has been removed from the cavity 26 the injection molding machine is ready for the next cycle.

Heretofore, when preheating and retightening of the insert were required, the molding cycle required approximately forty minutes to mold the jacket of plastic material at approximately one-tenth normal molding pressure. With the method of injection molding as carried out by the present invention the time of the molding cycle has been reduced to approximately thirty seconds.

While the embodiment of the present invention as herein disclosed constitutes a preferred form, it is to be understood that other forms might be adopted, all within the scope of the claims which follow.

Having thus described my invention, what I claim is new and desire to secure by Letters Patent of the United States is:

1. The method of injection molding a jacket of insulation around the outer periphery of a stack of axially-aligned, apertured, thin flat members which comprises assembling the members on a mandrel completely filling the apertures in the members, clamping the members axially between a pair of clamping members, placing the mandrel centrally in a mold cavity having a shape complementary to the stack and slightly greater in volume, holding the mandrel and clamping members centrally located in the cavity with the stack a uniform distance from the walls of the cavity, and introducing molding material under pressure from a single gate opposite one clamping member with the axis of the gate in alignment with the axis of the mandrel.

2. The method of controlling the stresses developed upon a stack of flat apertured inserts caused by the flow of molding material in an injection mold which comprises assembling the inserts on a mandrel completely filling the aperture in the inserts, clamping the inserts axially between a pair of clamping members, positioning the mandrel centrally in a material-receiving die cavity of slightly greater diameter than the stack, engaging one clamping member to hold the stack a uniform distance from the cavity walls with an uninterrupted space around the outer periphery of the stack, closing the mold with a male die portion which engages the other clamping member and cooperates with said material-receiving die cavity for shaping the molded product, and introducing the molding material under pressure from a single gate opposite a clamping member with the axis of the gate in alignment with the axis of the stack, whereby the forces due to the initial flow of molding material are exerted axially of the stack in the same direction as the mechanical clamping pressure applied by the clamping members.

3. The method of injection molding a jacket of insulation around a stack of apertured flat members which comprises assembling the members on a mandrel which completely fills the apertures in the members, clamping the members axially between two clamping members, centrally positioning the mandrel in the material-receiving cavity of one section of a pair of cooperating, relatively movable mold sections having cavities complementary to the stack and slightly greater in volume, engaging one clamping member to hold the stack a uniform distance from the cavity walls, moving one mold section into engagement with the other mold section to close the mold and simultaneously into engagement with the other clamping member, and introducing molding material under pressure into the cavity from a single cavity nozzle opposite one clamping member with the axis of the nozzle in alignment with the axis of the stack.

References Cited in the file of this patent

UNITED STATES PATENTS

| | | |
|---|---|---|
| 1,888,613 | Apple | Nov. 22, 1932 |
| 2,043,584 | Husted | June 9, 1936 |
| 2,058,938 | Apple | Oct. 27, 1936 |